United States Patent
Inagaki

(10) Patent No.: US 7,045,214 B2
(45) Date of Patent: May 16, 2006

(54) METHOD FOR RECYCLING OPTICAL DISK, RESIN COMPOSITION FOR FORMING FILM, AND RESIN MOLDED ARTICLE

(75) Inventor: Yasuhito Inagaki, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/853,332

(22) Filed: May 25, 2004

(65) Prior Publication Data

US 2004/0253405 A1    Dec. 16, 2004

(30) Foreign Application Priority Data

May 30, 2003 (JP) ............................ P2003-155500
May 30, 2003 (JP) ............................ P2003-155504

(51) Int. Cl.
*B32B 27/36* (2006.01)

(52) U.S. Cl. .................. 428/412; 359/642; 525/67; 528/176; 528/193; 528/196; 528/198; 528/271; 528/272

(58) Field of Classification Search ................ 359/642; 428/412; 525/67; 528/176, 193, 196, 198, 528/271, 272
See application file for complete search history.

(56) References Cited

U.S. PATENT DOCUMENTS

2003/0065092 A1*  4/2003  Takagi ........................ 525/67

* cited by examiner

*Primary Examiner*—Terressa Boykin
(74) *Attorney, Agent, or Firm*—Lerner, David, Littenberg, Krumholz & Mentlik, LLP

(57) ABSTRACT

A method for recycling an optical disk includes crushing a recovered optical disk without further treatment into chips that are used as a raw material of a resin composition for forming a film. The resin composition can be formed by injection molding to form a resin molded article. A film is formed on the surface of the resin molded article by plating or coating.

18 Claims, No Drawings

METHOD FOR RECYCLING OPTICAL DISK, RESIN COMPOSITION FOR FORMING FILM, AND RESIN MOLDED ARTICLE

BACKGROUND OF THE INVENTION

1. Field of the Invention

The present invention relates to a simple method for recycling an optical disk to utilize a used optical disk effectively. The present invention also relates to a resin composition for forming a film, the resin composition containing the used optical disk as a raw material, and to a resin molded article.

2. Description of the Related Art

Optical disks such as a digital versatile disk (DVD), a compact disk (CD), a mini disk (MD), and a magneto optical disk (MO) are media widely used for reproducing or recording images, music, and various data. The importance of the optical disks has been increasing.

Used optical disks are disposed of as a large amount of waste as well as known tape media such as video tapes, e.g., VHS tapes and 8 mm-VTR tapes, and music tapes. The recycling of the optical disks, which are mainly composed of, for example, polycarbonate of the substrate material, has been desirable.

However, it is very difficult to reuse the used optical disks as new optical disks because these used optical disks include various films such as a reflective film, a recording film, an adhesive layer, a protective layer, and a printing ink layer, and also contain various additives. Contamination prevents the highly reliable optical properties.

For example, Japanese Unexamined Patent Application Publication Nos. 2001-287225, 11-57683, and 8-164524 disclose various technologies for reusing the substrate material, i.e., polycarbonate resin. According to these patent documents, the optical disk is treated with chemicals to separate and remove the above films on the disk and various additives.

Unfortunately, according the known arts described in the patent documents, the use of a large amount of chemicals generates a large amount of waste liquid. Consequently, these methods result in the high cost of the chemicals and generate more waste, i.e., the waste liquid and the waste water.

In the above circumstance, a social strong desire for efficient recycling of the used optical disk, a large amount of which will be exhausted in the future, has been increasing.

SUMMARY OF THE INVENTION

In view of the above social background, it is an object of the present invention to provide a method for recycling an optical disk without using a large amount of chemicals and generating the waste liquid. According to this method, a used optical disk can be effectively recycled. It is an object of the present invention to provide a resin composition for forming a film, the resin composition produced by recycling the used optical disk, and a resin molded article.

As a result of intensive study to overcome the problems, the present inventor has found that the superior property for forming a film can be achieved by using chips prepared by crushing an used optical disk without further treatment as a resin material for forming a coated film or a plated film, or by blending the chips with a resin material for forming a coated film or a plated film.

The present invention is based on this fact. The method for recycling an optical disk of the present invention includes crushing a recovered optical disk without further treatment into chips that are used as a raw material of a resin composition for forming a film.

The resin composition for forming a film of the present invention includes chips prepared by crushing a recovered optical disk without further treatment. The resin molded article of the present invention is composed of a resin composition containing chips prepared by crushing a recovered optical disk without further treatment, and includes a film formed on at least a part of the surface of the resin composition.

According to the present invention, the use of the recovered optical disk without further treatment improves the property for forming a film. Although the detailed reason is unknown, for example, the previously formed films that are dispersed in the resin contribute to the film as active spots in some way, thereby improving the adhesiveness of the film such as a plated film or a coated film.

In any case, the resin composition produced by the method for recycling of the present invention has a superior adhesiveness to the plated film or the coated film. Therefore, the resin composition and the resin molded article of the present invention are very useful for, for example, casing of electronic devices. Furthermore, according to the present invention, since the optical disk is recycled by crushing without further treatment, chemicals used for, for example, removing the films are not required. Consequently, waste such as waste liquid and waste water is not generated. The method of the present invention contributes to global environmental protection in terms of effective utilization of resources and reducing waste.

According to the present invention, a used optical disk, i.e., a waste material can be effectively utilized as a raw material for a resin composition or a resin molded article for forming a plated film or a coated film.

DESCRIPTION OF THE PREFERRED EMBODIMENTS

A method for recycling an optical disk, a resin composition for forming a film, and a resin molded article according to present invention will now be described in detail.

According to the present invention, target optical disks for recycling include all types of known optical disks. Regardless of the standard or the configuration, any optical disk can be recycled in the same way. Examples of the optical disk include DVDs such as a DVD-R, a DVD-ROM, a DVD-R/W, and a DVD-RAM; CDs such as a CD-DA, a CD-R, a CD-ROM, a CD-R/W, and a CD-RAM; an MD; and an MO.

Polycarbonate resin is widely used as the substrate of these optical disks. Therefore, the polycarbonate is mainly reused in the present invention.

Polycarbonate is generally synthesized by a reaction of diphenol and a carbonate precursor. Diphenol is allowed to react with a carbonate precursor by a solution method or a fusion method. For example, the solution method includes a reaction of diphenol and phosgene, and the fusion method includes a transesterification of diphenol and diphenyl carbonate.

The substrate of an optical disk is generally composed of polycarbonate having a polystyrene-converted weight-average molecular weight of 10,000 to 100,000, preferably, 30,000 to 60,000. Polycarbonate having this range of weight-average molecular weight can be sufficiently reused.

When the weight-average molecular weight of the polycarbonate used as the substrate of the optical disk is not within the above range, the resin property is not satisfied.

For example, attention should be paid when using only the polycarbonate as a casing material. When the weight-average molecular weight of the polycarbonate is smaller than the lower limit of the above range, the impact resistance of the resin is decreased. On the other hand, when the weight-average molecular weight of the polycarbonate is larger than the upper limit of the above range, the fluidity of the resin is decreased.

In general, an optical disk has films and coatings thereon. According to the present invention, the used optical disk is effectively reused without further treatment, in other words, with the films and the coating materials.

The films and the coatings formed on the optical disk are not limited. Examples of the films and the coatings include a reflective film, a recording film, an adhesive layer, and a label ink layer. The optical disk may include any film material and any coating material that are generally used in the production process.

Examples of the film material and the coating material of the optical disk will now be described. Examples of the material of the reflective film include at least one element selected from the group consisting of Al, Au, and Si. Any grade of the material generally used for the optical disk may be used. The reflective film may be composed of a single material or an alloy containing other elements.

Examples of the material of the adhesive layer include a composition containing an acrylate, and a mixture of a composition containing an acrylate and other components, for example, 2-hydroxypropyl acrylate and various additives. Any grade of the material generally used for the optical disk may be used.

Examples of the material of the label ink layer include at least one component selected from the group consisting of an ultraviolet-curing monomer, the oligomer, and the polymer. Specifically, examples of the material of the label ink layer include at least one component selected from the group consisting of an acrylic acrylate, an ether acrylate, a vinyl monomer, a vinyl oligomer, and a vinyl polymer. The material of the label ink layer may further include a polymerization initiator, a pigment, and an auxiliary material.

Examples of the material of the recording film include an organic coloring matter containing a cyanine coloring matter and an inorganic alloy composed of Te, Se, S, Ge, In, Sb, Fe, Tb, Co, Ag, Ce, and Bi.

According to the present invention, an optical disk containing the above materials is finely crushed without further treatment so as to reuse resultant pellets as a resin material. In more detail, the optical disk is finely crushed into chips, melted, and pelletized. The resultant pellets are used as a resin composition. Recovered optical disks may be directly charged in, for example, a hopper depending on the structure of an injection molding machine.

In the resin composition produced by this method, the film materials and the coating materials are included in, for example, polycarbonate of the disk substrate. Coating or plating can be preferably performed on such a resin composition because of a good affinity between the remaining materials and the coated film or the plated film formed thereon.

According to the present invention, the recovered optical disk may be reused by itself as the resin composition and the resin molded article. Alternatively, the recovered optical disk may be blended with other resins to reuse. The content of the recovered optical disk in a blended resin is preferably 1 to 99 percent by weight. Examples of the resin that is blended with the used optical disk include polycarbonate (PC); acrylonitrile-butadiene-styrene (ABS); acrylonitrile-styrene (AS); polystyrene (PS); high impact polystyrene (HIPS); syndiotactic polystyrene (SPS); styrene-butadiene rubber (SBR); styrene-butadiene-styrene rubber (SBS); methyl methacrylate-styrene; methyl methacrylate-butadiene-styrene (MBS); isoprene-styrene rubber; isoprene rubber; polybutadiene (PB); butadiene-acrylic rubber; isoprene-acrylic rubber; ethylene-propylene rubber; polymethyl methacrylate (PMMA); polyphenylene sulfide (PPS); polyphenylene ether (PPE); polyethylene terephthalate (PET); polybutylene terephthalate (PBT); polypropylene (PP); polyethylene (PE); nylon 6; nylon 66; nylon 12; and polymer alloys such as PC/ABS, PC/PS, PC/HIPS, PC/PP, PC/PE, PC/PMMA, PC/PET, and PC/PBT. In terms of, for example, the physical properties, PC, ABS, PS, HIPS, PB, PMMA, PET, PBT, PP, PE, PC/ABS, PC/PS, PC/HIPS, PC/PP, PC/PE, PC/PMMA, PC/PET, and PC/PBT are preferable.

The above resins are commercially available. The resins have various grades suitable for, for example, a general purpose, a high rigidity, a high impact strength, an anti abrasion, a high lubricant, a heat resistance, a flame retardant, a transparency, a high gloss, a chemical resistance, and a painting. The resins may further include various additives such as an antistatic agent, a coloring agent such as carbon black, a pigment, an anti-oxidant, a flame retardant, a plasticizer, a light-resistance improver, a compatibilizer, a surface treatment agent, a modifier, glass fiber, paper, and non-woven fabric. The resins may be, for example, runners or discarded materials of the pellets, which are not commercially available, produced in a resin factory. Alternatively, the resins may be recycled resins recovered from the marketplace. Recycled resins produced in a factory or recycled products recovered from standardized products (i.e., the same product or the same product group) are preferably reused because these resins have uniform physical properties.

The blend of the resins described above with used optical disks provides adsorption sites, which are connected with the coating material or the plating material, on the surface of the mixed resin. Accordingly, resin compositions and resin molded articles, which have superior properties for forming a film and have a wide variety of grades, can be produced.

A compatibilizer may be added to the mixture of the above resins and the used optical disks. Examples of the compatibilizer include an epoxy-modified block copolymer and a graft polymer produced by graft polymerization of a vinyl monomer to a polyolefin main chain. Specifically, examples of the graft polymer include LDPE-g-PS, PP-g-PS, EGMA-g-PS, EEA-g-PS, EVA-g-PS, E/EA/MAH-g-PS, LDPE-g-PMMA, EGMA-g-PMMA, EEA-g-PMMA, EVA-g-PMMA, E/EA/MAH-g-PMMA, LDPE-g-AS, PP-g-AS, EGMA-g-AS, EEA-g-AS, EVA-g-AS, and E/EA/MAH-g-AS, wherein EGMA represents ethylene-glycidyl methacrylate copolymer, EEA represents ethylene-ethylacrylate copolymer, EVA represents ethylene-vinyl acetate copolymer, and E/EA/MAH represents ethylene-ethylacrylate-maleic anhydride copolymer.

As described above, in general, the resin composition and the resin molded article to be recycled include polycarbonate because the substrate of the optical disk is generally composed of polycarbonate. Therefore, additives that are generally added to a polycarbonate resin may be used in the present invention. For example, a frame retardant may be added to the resin composition or the resin molded article. Examples of the flame retardant include at least one flame retardant selected from the group consisting of a halogen-based flame retardant, a phosphorus-based flame retardant, a nitrogen-based flame retardant, an inorganic flame retardant, a silicon-based flame retardant, a metal salt-based flame retardant, and a fluorine-based flame retardant.

Examples of the halogen-based flame retardant include halogenated bisphenols, aromatic halides, halogenated polycarbonates, halogenated aromatic vinyl polymers, halogenated cyanurate resins, and halogenated polyphenylene ethers. In particular, decabromodiphenylether, tetrabromobisphenol A, a oligomer of tetrabromobisphenol A, brominated bisphenol-based phenoxy resins, brominated bisphenol-based polycarbonates, brominated polystyrene, brominated crosslinked polystyrene, brominated polyphenylene ether, polydibromophenylene ether, decabromodiphenylether-bisphenol condensate, halogen-containing phosphates, and fluorocarbon resins are preferable.

Examples of the phosphorus-based flame retardant include organic phosphorus compounds, red phosphorus, and inorganic phosphates.

Examples of the organic phosphorus compound include phosphines, phosphine oxides, biphosphines, phosphonium salts, phosphinates, phosphates, and phosphites. Specifically, triphenyl phosphate, methyl neopentyl phosphite, pentaerythritol diethyl diphosphite, methyl neopentyl phosphonate, phenyl neopentyl phosphate, pentaerythritol diphenyl diphosphate, dicyclopentyl hypodiphosphate, dineopentyl hypophosphite, phenyl pyrocatechol phosphite, ethyl pyrocatechol phosphite, dipyrocatechol hypodiphosphate, phenoxy propoxy phosphazene, diphenoxy phosphazene, phenoxy amino phosphazene, and phenoxy fluoroalkyl phosphazene may be used. In particular, a monomer and a condensate of an aromatic phosphate are preferably used.

The red phosphorus includes general red phosphorus. In addition, the surface of the red phosphorus may be coated with a metal hydroxide such as aluminum hydroxide, magnesium hydroxide, zinc hydroxide, and titanium hydroxide. The surface of the red phosphorus may be coated with a film composed of a metal hydroxide such as aluminum hydroxide, magnesium hydroxide, zinc hydroxide, and titanium hydroxide; and a thermosetting resin. The surface of the red phosphorus may be coated with two films; that is, a first film composed of a metal hydroxide such as aluminum hydroxide, magnesium hydroxide, zinc hydroxide, and titanium hydroxide and a second film composed of a thermosetting resin formed on the first film.

Examples of the inorganic phosphate include poly-ammonium phosphate.

Examples of the nitrogen-based flame retardant include at least one compound selected from the group consisting of triazine, triazole, tetrazole, phosphazene and diazo compounds. Specifically, melamine, melam, melem, mellon, melamine cyanurate, melamine phosphate, succinoguanamine, adipoguanamine, methylglutaroguanamine, melamine resin, and bismaleimide triazine (BT) resin may be used. In particular, melamine cyanurate is preferable.

Examples of the inorganic flame retardant include silica, sodium sulfate, calcium sulfate, potassium sulfate, aluminum hydroxide, magnesium hydroxide, zirconium hydroxide, barium hydroxide, calcium hydroxide, dolomite, hydrotalcite, basic magnesium carbonate, hydrated tin oxide, aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide, aluminum, iron, titanium, manganese, zinc, molybdenum, cobalt, bismuth, chromium, nickel, copper, tungsten, tin, antimony, stainless steels (SUS), zinc borate, zinc metaborate, barium metaborate, zinc carbonate, magnesium carbonate, calcium carbonate, barium carbonate, and hydrated glass. These inorganic flame retardants may be used alone or in combination of two or more. Among these inorganic flame retardants, aluminum hydroxide, magnesium hydroxide, basic magnesium carbonate, hydrotalcite, and hydrated glass are preferable.

Examples of the silicon-based flame retardant include silicone compounds and silane compounds.

Examples of the silicone compound include silicone oil composed of polydiorganosiloxane and silicone resins composed of repeating units such as $SiO_2$, $RSiO_{3/2}$, $R_2SiO$, and $R_3SiO_{1/2}$ in combination, wherein R represents a methyl group, an ethyl group, a propyl group, a phenyl group, a benzyl group, or a vinyl group. Specifically, examples of the silicone resin include polydimethylsiloxane, polymethylphenylsiloxane, polydiphenylsiloxane, polymethylethylsiloxane, polycarbosiloxane, and mixtures thereof. The silicone resins preferably have a number-average molecular weight of 200 to 5,000,000. The silicone resins may be oily, varnishy, gummy, powdery, or pelletized.

Examples of the silane compound include polyalkylsilane and polycarbosilane compounds. In particular, polymethylphenylsilane, polydiphenylsilane, and polyphenylsilane are typically used. The ends of these compounds may be a hydroxyl group or an alkyl group, or may form a ring.

Examples of the metal salt-based flame retardant include metal salts of organic sulfonic acid such as metal salts of trichlorobenzenesulfonic acid, metal salts of perfluorobutanesulfonic acid, and metal salts of diphenylsulfone-3-sulfonic acid; metal salts of aromatic sulfonimide; alkali metal salts of polystyrenesulfonic acid or metal salts of polyphenylene sulfonic acid wherein a metal salt of sulfonic acid, a metal salt of sulfuric acid, a metal salt of phosphoric acid, or a metal salt of boric acid is combined with an aromatic ring of an aromatic group-containing polymer such as styrene polymer, a styrene copolymer, or polyphenylene ether. Preferable examples of the metal used for the metal salt include alkali metals, alkaline earth metals, Zn, Sn, Al, and Sb.

The fluorine-based flame retardant is composed of a resin containing fluorine atoms. Examples of the resin include polymonofluoroethylene, polydifluoroethylene, polytrifluoroethylene, polytetrafluoroethylene, and tetrafluoropropylene-hexafluoropropylene copolymer. If necessary, a monomer that is copolymerized with the above fluorine-containing monomer may be used in combination. The fluorocarbon resin preferably has an average molecular weight of 100,000 to 10,000,000.

The fluorine-based flame retardant is generally used as a drip inhibitor. Other examples of the drip inhibitor include silicone resin, phenol resin, aramid resin (fiber), and polyacrylonitrile resin (fiber). If necessary, the drip inhibitor may also include a thermoplastic elastomer. Examples of the thermoplastic elastomer include polyolefin, polyester, polyurethane, 1,2-polybutadiene, and polyvinylchloride elastomers.

According to the present invention, if necessary, various additives may be added to the recycled resin composition or the resin molded article as long as the physical properties are not impaired. Examples of the additives include a pigment, a dye, a lubricant, an ultraviolet absorber, a hindered amine light stabilizer, an antioxidant, a halogen scavenger, a light-shielding agent, a metal deactivator, a quencher, an antistatic agent, a reinforcing agent, and fillers. For example, in order to produce an electromagnetic shielding material, the resin composition may be formed by insert molding so as to combine the resin composition with a metal part.

The above materials are mixed in an appropriate ratio, melted, and kneaded to produce a resin composition. The mixing and the kneading are performed with general apparatuses. For example, the materials are preliminarily mixed with a ribbon blender or a drum tumbler, and then kneaded with a Banbury mixer, a single-screw extruder, a double-screw extruder, a multi-screw extruder, or a ko-kneader. Although the temperature of the resin materials during kneading depends on the kinds of the resin to be mixed, the temperature is generally controlled in the range of 150° C. to 300° C. In this case, an extruder, in particular, a vented extruder is preferably used in order to melt, knead, and form the materials. Components other than the optical disk may be melted and kneaded with polycarbonate or other thermoplastic resins in advance. That is, the other components may be added to a masterbatch.

The resin composition is formed to a desired shape to produce various formed articles (i.e., resin molded articles). The resin composition may be formed with the above described apparatuses used for melting, kneading, and forming. Alternatively, the resultant pellets may be formed by, for example, injection molding, injection-compression molding, extrusion, blow molding, press molding, vacuum molding, or foaming molding.

As described above, the resin composition recycled by the method of the present invention has a superior adhesiveness to a film such as a plated film or a coated film formed thereon. Accordingly, the resin composition is preferably used to form, for example, a casing of various devices. The plated or coated film is formed on at least a part of the surface of the casing. Thus, the resin composition is preferably used as a molded article.

The resin composition (i.e., the resin molded article) is plated by a general plating method for a resin. For example, the plating method includes the steps of degreasing, chemical etching, chemical plating, and electroplating. The method may also include a neutralization treatment, a catalyst treatment, or an accelerator treatment in combination. In the degreasing step, a surfactant is used. In the chemical etching step, a mixed solution containing an oxidizing agent and an acid is used. After the chemical etching, a series of treatment including, for example, the neutralization treatment, the catalyst treatment, and the accelerator treatment is performed. These treatments accelerate a smooth precipitation of a plated film in the chemical plating step. These treatments also improve the adhesiveness between the plated film and the base resin. Subsequently, the molded article is submerged in a chemical plating bath containing a metal, and plated with the metal. Thus, the chemical plating is performed on the molded article. Furthermore, the electroplating of, for example, copper, nickel, or chromium is performed on the chemically plated film by a known method. The electroplating is performed on the molded article, thus producing a plated product, which is a resin molded article of the present invention.

The resin composition (i.e., the resin molded article) is coated by a coating material. Examples of the coating material include acrylic lacquer coatings, polyester coatings, two-component epoxy coatings such as an acrylic-epoxy coating and an epoxy-polyester coating, acrylic coatings, two-component acrylic-silicone coatings, alkyd coatings, melamine resin baking coatings, acrylic resin baking coatings, phthalic resin coatings, fluorocarbon coatings, cationic electrodeposition primers, polyurethane coatings, acrylic urethane coatings, polyester-modified acrylic urethane coatings, and alkylated amino resin coatings. These coatings are coated on the molded article at least one time, for example, by spraying or dipping, or with a roller or a brush. Thus, the molded article is coated with the coating material.

EXAMPLES

Examples of the present invention will now be described with reference to experimental results.

Preparation for Resin Molded Articles

Used CDs, DVDs, and MDs with aluminum were recovered and crushed into chips. The chips were melted, kneaded, and then formed with an injection molding machine to form resin molded articles, i.e., device cases. Molded articles represented by Sample Nos. 2, 3, 5, and 7 were composed of a resin composition containing only the used optical disks. Molded articles represented by Sample Nos. 9, 11, 13, and 15 were composed of a resin composition containing the used optical disks and other resins. For comparison, molded articles represented by Sample Nos. 1, 4, and 6 were composed of only a polycarbonate. In addition, molded articles represented by Sample Nos. 8, 10, 12, and 14 were composed of a resin composition containing the polycarbonate and other resins.

The blended other resins were an ABS resin (Cycolac™ Y-540A, Ube Cycon, Ltd.) and a HIPS (Styron™ 9405, Asahi Kasei Corporation). The polycarbonate used in the examples was Panlite™ L-1225WP (Teijin Chemicals Ltd.).

Formation of Film

Various films were formed on the surface of the above resin molded articles. The films include plated films, i.e., copper films by electroplating and nickel films by chemical plating, and coated films by coating of a two-component acrylic-urethane coating.

Evaluation

Adhesiveness of the film was evaluated in each sample having the plated film or the coated film thereon.

In more detail, in order to evaluate the adhesiveness of the plated film, the plated film was cut at a fixed width (10 mm). Subsequently, a peel-strength was measured during vertically peeling the plated film from a test piece. The peel-strengths of the each test piece were compared. The peeling test for the coated film was performed as follows: Test pieces on which the coating was applied at one time were used for the test. A grid-shaped cross cut (100 grids having 1 mm×1 mm in size) was formed on the coated film with a multi-cross cutter. The coated film was peeled with an adhesive cellophane tape. Subsequently, the average value was calculated by the formula, (the number of grids holding the coated film)/(the number of total grids). The average values of the each test piece were compared. Table 1 shows the results.

TABLE 1

| | Base resin | | | | Film | | |
|---|---|---|---|---|---|---|---|
| | Component A | | Component B | | | Adhesiveness | |
| No. | Resin | % by weight | Resin | % by weight | Film formation | Peel-strength (kgf) | Peeling test |
| 1 | Pc | 100 | — | — | Copper electroplating | Unsuccessful plating | — |
| 2 | Recovered CD | 100 | — | — | Copper electroplating | 0.9 | — |
| 3 | Recovered DVD | 100 | — | — | Copper electroplating | 1 | — |
| 4 | PC | 100 | — | — | Chemical nickel plating | Unsuccessful plating | — |
| 5 | MO with Al | 100 | — | — | Chemical nickel plating | 0.9 | — |
| 6 | PC | 100 | — | — | Two-component acrylic-urethane coating | — | 92/100 |
| 7 | MD with Al | 100 | — | — | Two-component acrylic-urethane coating | — | 100/100 |
| 8 | PC | 70 | ABS | 30 | Chemical nickel plating | 0.8 | — |
| 9 | Recovered CD | 70 | ABS | 30 | Chemical nickel plating | 1.1 | — |
| 10 | PC | 70 | ABS | 30 | Two-component acrylic-urethane coating | — | 97/100 |
| 11 | Recovered DVD | 70 | ABS | 30 | Two-component acrylic-urethane coating | — | 100/100 |
| 12 | PC | 80 | HIPS | 20 | Copper electroplating | 0.7 | — |
| 13 | Recovered DVD | 80 | HIPS | 20 | Copper electroplating | 1.2 | — |
| 14 | PC | 80 | HIPS | 20 | Two-component acrylic-urethane coating | — | 90/100 |
| 15 | Recovered CD | 80 | HIPS | 20 | Two-component acrylic-urethane coating | — | 100/100 |

As shown in Table 1, the use of various recovered optical disks instead of the new polycarbonate as a material provided molded articles having superior adhesiveness of plated and coated films.

The invention claimed is:

1. A method for recycling an optical disk comprising the steps of:
   selecting the optical disk to include at least a reflective film, a recording film, an adhesive layer, and a label ink layer;
   crushing the selected optical disk into chips; and
   kneading the chips exactly as obtained from the step of crushing with at least one other resin and a compatibilizer to form a resin composition for forming a film.

2. The method for recycling an optical disk according to claim 1, further comprising the step of selecting the optical disk from the group consisting of a DVD, a CD, a mini-disk (MD), and a magneto-optical disk (MO).

3. The method for recycling an optical disk according to claim 1, further comprising the step of selecting the optical disk to include a substrate comprising polycarbonate.

4. The method for recycling an optical disk according to claim 3, wherein the polycarbonate has a polystyrene-converted weight-average molecular weight of 10,000 to 100,000.

5. The method for recycling an optical disk according to claim 1, further comprising the step of selecting the at least one other resin from the group consisting of a polycarbonate having a different molecular weight from that of a polycarbonate in the optical disk, ABS, an ABS/polycarbonate alloy, a high impact polystyrene/polycarbonate alloy, high impact polystyrene, polystyrene, polyethylene terephthalate, polypropylene, polyethylene, polybutylene terephthalate, and polymethyl methacrylate.

6. A resin composition for forming a film comprising:
   chips prepared by crushing a recovered optical disk including a reflective film, a recording film, an adhesive layer, and a label ink layer, wherein the chips are melted exactly in the form obtained from the crushing, combined with at least one other resin and a compatibilizer and then pelletized.

7. The resin composition for forming a film according to claim 6, wherein the optical disk comprises at least one optical disk selected from the group consisting of a DVD, a CD, a mini-disk (MD), and a magneto-optical disk (MO).

8. The resin composition for forming a film according to claim 6, wherein the optical disk includes a substrate comprising polycarbonate.

9. The resin composition for forming a film according to claim 8, wherein the polycarbonate has a polystyrene-converted weight-average molecular weight of 10,000 to 100,000.

10. The resin composition for forming a film according to claim 6, wherein the at least one other resin is selected from the group consisting of a polycarbonate having a different molecular weight from a molecular weight of a polycarbonate in the optical disk, ABS, an ABS/polycarbonate alloy, a high impact polystyrene/polycarbonate alloy, high impact polystyrene, polystyrene, polyethylene terephthalate, polypropylene, polyethylene, polybutylene terephthalate, and polymethyl methacrylate.

11. A resin molded article comprising:
    a resin composition including chips prepared by crushing a optical disk including a reflective film, a recording film, an adhesive layer, and a label ink layer, and
    including at least one other resin and a compatibilizer kneaded with the chips exactly as obtained from the crushing.

12. The resin molded article according to claim 11, wherein the optical disk comprises at least one optical disk selected from the group consisting of a DVD, a CD, a mini-disk (MD), and a magneto-optical disk (MO).

13. The resin molded article according to claim 11, wherein the optical disk comprises a substrate formed of polycarbonate.

14. The resin molded article according to claim 13, wherein the polycarbonate has a polystyrene-converted weight-average molecular weight of 10,000 to 100,000.

15. The resin molded article according to claim 11, wherein the at least one other resin is selected from the group consisting of a polycarbonate having a different molecular weight from that of a polycarbonate in the optical disk, ABS, an ABS/polycarbonate alloy, a high impact polystyrene/polycarbonate alloy, high impact polystyrene, polystyrene, polyethylene terephthalate, polypropylene, polyethylene, polybutylene terephthalate, and polymethyl methacrylate.

16. The method for recycling an optical disk according to claim 1, further comprising the step of selecting the compatibilizer from an epoxy-modified block copolymer and a graft polymer produced by graft polymerization of a vinyl monomer to a polyolefin main chain.

17. The resin composition for forming a film according to claim 6, wherein the compatibilizer is selected from an epoxy-modified block copolymer and a graft polymer produced by graft polymerization of a vinyl monomer and a polyolefin main chain.

18. The resin molded article according to claim 11, wherein the compatibilizer is selected from an epoxy-modified block copolymer and a graft polymer produced by graft polymerization of a vinyl monomer and a polyolefin main chain.

* * * * *